(12) United States Patent
Gail

(10) Patent No.: US 6,375,013 B1
(45) Date of Patent: Apr. 23, 2002

(54) DEVICE FOR CLEANING VISCOUS MATERIAL

(76) Inventor: Josef Gail, Klausenweg 4, D-86551 Aichach-Unterwittelsbach (DE)

( * ) Notice: Subject to any disclaimer, the term of this patent is extended or adjusted under 35 U.S.C. 154(b) by 0 days.

(21) Appl. No.: 09/341,128

(22) PCT Filed: Jan. 13, 1998

(86) PCT No.: PCT/EP98/00170

§ 371 Date: Sep. 20, 1999

§ 102(e) Date: Sep. 20, 1999

(87) PCT Pub. No.: WO98/31527

PCT Pub. Date: Jul. 23, 1998

(30) Foreign Application Priority Data

Jan. 14, 1997 (DE) .......................................... 197 01 002
Feb. 7, 1997 (DE) .......................................... 197 04 621

(51) Int. Cl.[7] .................... B01D 29/09; B01D 33/048
(52) U.S. Cl. .................... 210/391; 210/400; 210/387
(58) Field of Search ............................... 210/387, 391, 210/400, 401, 416.1

(56) References Cited

U.S. PATENT DOCUMENTS

| | | | |
|---|---|---|---|
| 3,356,224 A | 12/1967 | Orr | 210/401 |
| 3,645,399 A | 2/1972 | Kalman | 210/387 |
| 3,856,674 A | 12/1974 | Kalman | 210/71 |
| 3,992,298 A | 11/1976 | Davis | 210/401 |
| 4,080,297 A | 3/1978 | Yoshida | 210/387 |
| 4,282,095 A * | 8/1981 | Tsuhuko | 210/387 |
| 4,568,460 A * | 2/1986 | Bratten | 210/387 |
| 4,614,583 A * | 9/1986 | Hawkes | 210/400 |
| 5,320,753 A | 6/1994 | Keillor, III et al. | 210/398 |
| 5,368,732 A * | 11/1994 | Pierson | 210/401 |
| 5,462,677 A * | 10/1995 | Benesi | 210/400 |

FOREIGN PATENT DOCUMENTS

| | | |
|---|---|---|
| CH | 469 547 | 4/1969 |
| DE | 2 319 270 | 1/1974 |
| DE | 25 58 447 | 1/1979 |
| DE | 35 35 491 C1 | 2/1987 |
| DE | 37 10613 | 10/1988 |
| DE | 42 15 931 | 11/1993 |
| DE | 43 08 685 | 4/1994 |
| EP | 0 275 462 | 7/1988 |
| EP | 0 615 829 | 9/1994 |
| FR | 2 332 113 | 11/1975 |
| GB | 2 001 544 | 2/1979 |

OTHER PUBLICATIONS

Patent Abstracts of Japan, vol. 010, No. 385, Dec. 24, 1986, JP 61 175016.
Patent Abstracts of Japan, vol. 005, No. 025, Feb. 14, 1981, JP 55 154112.

* cited by examiner

*Primary Examiner*—Christopher Upton
(74) *Attorney, Agent, or Firm*—Arent Fox Kintner Plotkin & Kahn, PLLC

(57) ABSTRACT

A cleaning device for removing solid impurities from viscous material, in particular molten plastics material, comprising, inside a housing (1), a filter band (5) for separating out solid impurities which can be moved in the longitudinal direction of the housing. The filter band (5) is wrapped around a curved supporting area (7) of a fixed supporting member (3) at an angle of wrap of preferably approximately 180°, and is guided on both sides of the curved supporting area (7) in planar supporting areas (15, 17) which lie tangentially and flush against the curved supporting area (7). To reduce the kinetic resistance of the filter band (5), the curved supporting area (7) and at least partly the planar supporting areas (15, 17) are provided with channels (25) extending in the direction of transport of the filter band (5). The plastic material to be cleaned is supplied via a feeding chamber (23) surrounding the supporting area, and after it has been cleaned, is removed via connecting ducts (27, 35) extending from the channels (25). On the outlet side of the cleaning device the filter band (5) passes through a cleaning solution (67). In this way, the filter band can be reused. The proposed cleaning device is compact and allows for relatively large effective filtering surfaces.

20 Claims, 5 Drawing Sheets

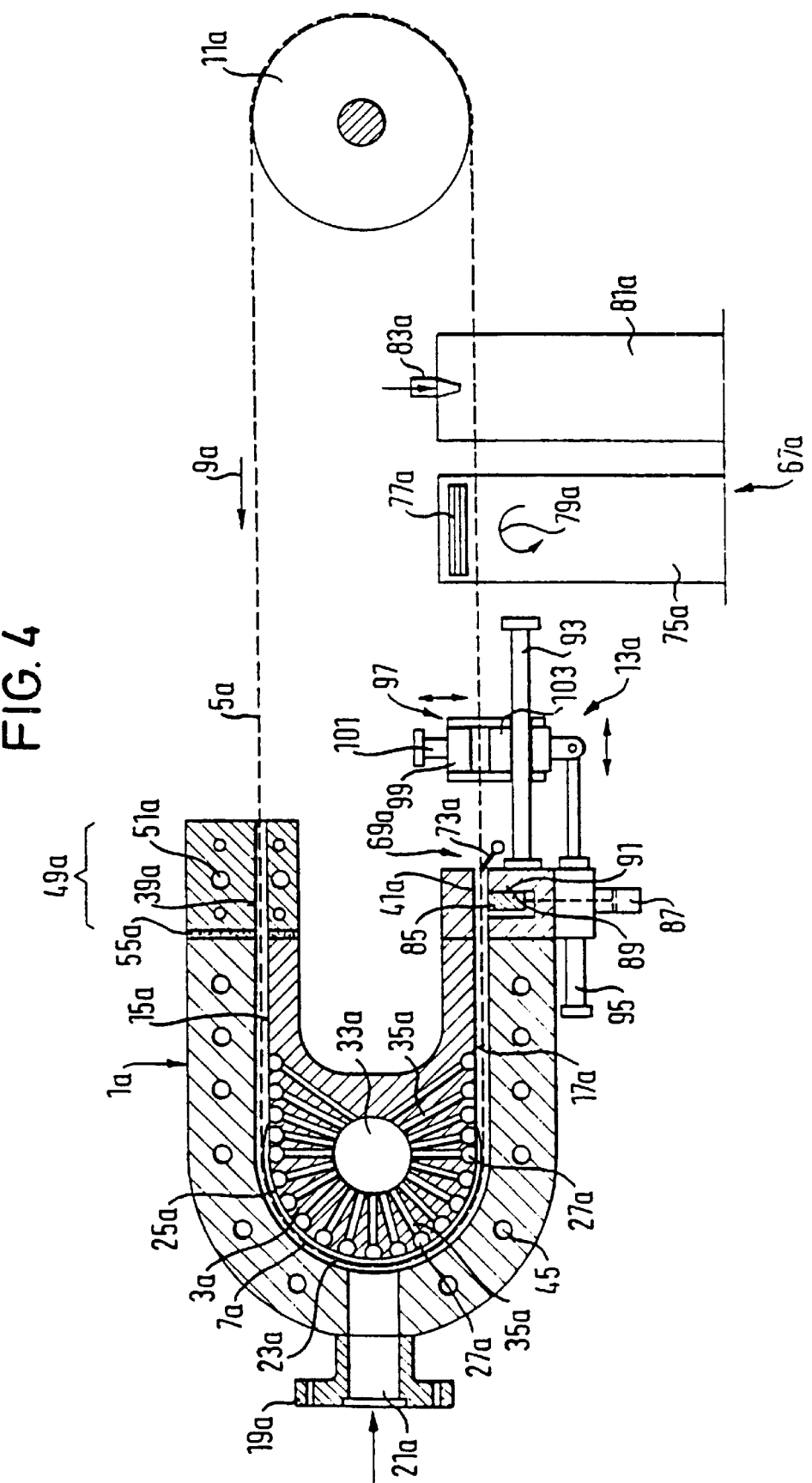

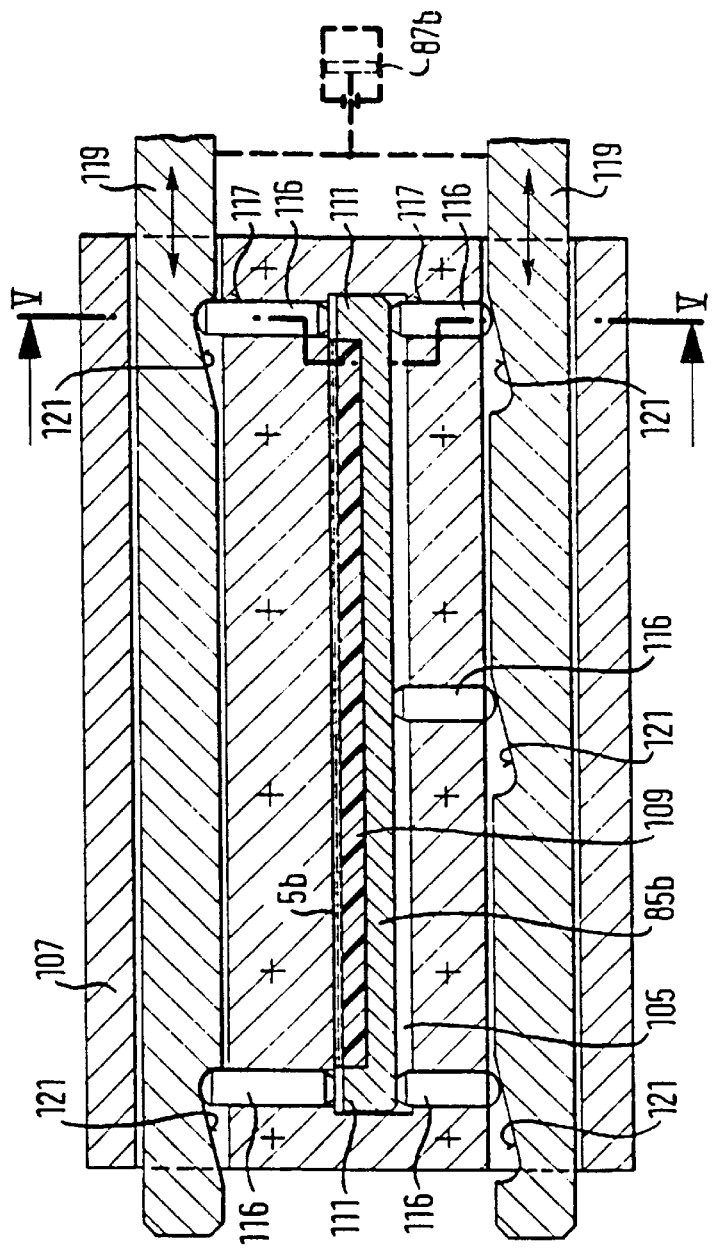
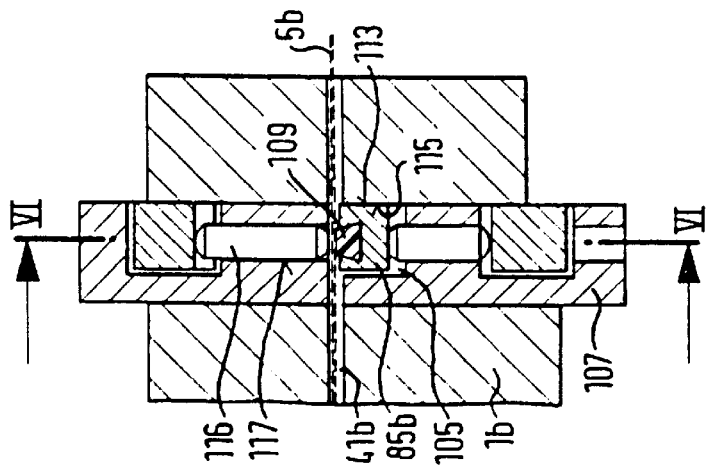

DEVICE FOR CLEANING VISCOUS MATERIAL

BACKGROUND OF THE INVENTION

The invention relates to apparatus for purifying viscous materials, in particular to rid a plastic melt of solid contaminants.

The European patent document A1 615 825 discloses apparatus allowing to separate solid contaminants, for instance metal particles or the like, from a viscous thermoplastic melt. The known apparatus comprises a tubular-cylindrical sifting device fitted with a plurality of narrow holes in its casing. The sifting device is seated in a support pipe containing a plurality of circumferentially arrayed axial ducts to evacuate the purified material and merging at the inside surface of the support pipe into circumferential channels open toward the apertures of the sifting device. The circumferential channels may be formed either into the sifting device or into the support pipe. To carry out purification, the plastic melt is forced by an extruder into the cavity of the filter and is evacuated in purified form from the outside of the filter through the ducts of the support pipe. A rotating scraper shaft coaxially mounted in the filter scrapes the filtered contaminants from the filter. To prevent clogging the filter apertures of the filter, the hole diameter may not drop below a minimum size, entailing the drawback of degrading the purity of the purified plastic.

It is further known from the German patent document C1 35 35 491 and the Swiss patent document 469,547 to press the plastic melt to be purified by an extruder through a narrow-mesh wire cloth filter band resting at the exit side of the purified plastic melt on a support fitted with a plurality of comparatively large passages. The sifting band retains the solid contaminants to be separated and is moved by a hydraulic conveyor or by hydrostatic forces exerted by the melt along the supporting surface of the support in order to move the solid contaminants out of the flow path of the plastic. In the known apparatus the support surface is planar and the sifting band also is moved along a plane. Overall, however, the area of the of the sifting belt cross the flow path of the plastic is comparatively small and the purification output of the apparatus will not meet high requirements.

The molten plastic to be purified is highly viscous and accordingly requires high feed pressure which the narrow-mesh, preferably metal-woven filter band, cannot withstand per se at substantially large surface. The ratio of support surfaces where the filter can be supported on one hand to aperture cross-sections of the passages issuing into the support surface on the other hand must be selected in relation to the particular strength of the filter band.

Conventional supports are fitted with a plurality of boreholes arranged in a grid and passing many times through the lamellar support. However supports of this design cannot meet the higher requirements of filter performance because excessively small boreholes tend to clog and excessively wide boreholes cannot adequately brace the filter band. Moreover the borehole size affects the mechanical strength of the support and limits its load-bearing area to comparatively small values if an excessively bulky and hence heavy design of the purifying apparatus must be avoided.

The Japanese patent document A 61-175 016 (Patent abstracts of Japan M-548, 24 Dec. 1986, vol. 10/#385) and also U.S. Pat. No. 4,080,297 disclose that the filter band is guided over part of the circumference of a circular-cylindrical, hollow support drum fitted at its circumference with a plurality of radial slits. The plastic melt to be purified is fed radially from the outside to the filter band and is evacuated in purified form from the inside of the support drum. The wrap angle of the filter belt may amount to 180° and more, and accordingly a comparatively large effective filter surface is possible. Similar filter systems are described in U.S. Pat. Nos. 3,645,399 and 3,856,674. However as regards purifying apparatus with a rotating support drum, not only is it necessary to provide sufficient sealing of the intake and outlet ducts of the filter band relative to the housing on account of the high feed pressure of the plastic melt, but furthermore the support drum must be sealed in the zone of these ducts. Wedge-shaped cutters are integrated into the housing in the vicinities of the feed side and the evacuation side of the filter band and penetrate at the feed side or at the discharge side between the filter band and the circumferential surface of the support drum. Because such cutters must be of a minimum thickness on account of the high prevailing pressures, the filter band is strongly deformed especially when passing from the support drum to the evacuation-side cutter, and thereby this filter band is susceptible to damage.

Compared with rotating support drums, the filter belt used with stationary supports is exposed to very high motional drag already stopping the filter band from being advanced at a comparatively small effective filtering area as long as it will be exposed to the high pressure of the plastic melt. The high pressure of the plastic melt forces the filter belt into the plurality of passages of the stationary support and the filter then snags on the support. In order to nevertheless move the filter band, the pressure of the plastic melt is lowered in conventional purification apparatus on the feed side. Illustratively it is known from the German patent document C1 35 35 491 to enlarge the volume of the feed chamber to further lower the pressure. The European patent document A2 0,275,462 discloses alternatingly feeding the plastic melt to be purified through a three-way valve to two purifying apparatus. The particular purifying apparatus not in the purifying mode therefore is unpressurized and its filter band thus can be moved. In spite of the decrease in feed pressure of the plastic melt, the motional drag of the filter belt remains relatively high as before, and on that account the effective filtering area must be kept comparatively small when using a stationary support.

SUMMARY OF THE INVENTION

The object of the invention is to create apparatus to purify viscous materials, in particular to rid a plastic melt of solid contaminants, such apparatus on one hand being compact and on the other hand allowing purifying the material to high purity and with comparatively high purification outputs.

The apparatus of the invention for purifying a viscous material, in particular to rid a plastic melt of solid contaminants, comprises:
- a housing having a feed duct for the material to be purified and an evacuation duct for the purified material,
- a filter band/belt, hereafter generally called merely "filter belt", displaceable in its longitudinal direction, to separate the solid contaminants and passing through the material's flow path in sealed manner between the feed duct and the evacuation duct,
- a stationary support structure in the flow path on the side of the filter belt facing the evacuation duct and comprising a support surface supporting the filter belt of which the contour follows the filter belt over a curved segment of the support surface wrapping the filter belt over a wrap angle large than 90°, said segment being substantially in the form of a cylindrical surface, in particular a circular cylindrical surface and being substantially planar in the support surfaces which adjoin tangentially and tightly the curved support surface, fitted with a plurality of mutually parallel channels running next to each other in the direction of displacement of the filter belt and open toward the support surface at least within the curved support surface, and fitted with a plurality of passage ducts starting from the channels to move the purified material to the evacuation duct, a conveyor to advance the filter belt in continuous or step-wise manner.

The purification apparatus is very compact because of the curvature of the support structure, even when the effective area of the filter belt is comparatively large. Moreover such a support structure better withstands the high feed pressure of the plastic melt, which may reach 300 bars or more. Also the dead volume of the plastic melt in such a design is comparatively minor, thereby facilitating caloric control of the purification process.

Because the planar support surfaces adjoin the curved one in tangential and flush manner, that is continuously and without a jump, the filter belt—contrary to the conventional case of purification apparatus with rotating support drums—is not mechanically deformed when entering or leaving the curved support surface, this feature being especially advantageous when the filter belt must be cleaned and reused. Because at least the curved support surface is fitted with channels running in the direction of advance, the motional drag on the filter belt can be kept comparatively low. Even if the filter belt were to deform into the channels on account of the pressure of the plastic melt, it can nevertheless be moved along the channels since the passage ducts issue into the channels, not directly into the support surface.

In a preferred embodiment, the planar support surfaces are fitted at least in a small zone adjoining the curved support surface with a plurality of mutually parallel channels running in the direction of advance of the filter belt and open toward the support surface, and being the starting points of the passages moving the purified material to the evacuation duct. Such a design makes possible extraordinary large effective filter surfaces, in particular when the wrap angle by which the filter belt wraps the curved support surface is about 180° or even larger.

A stable design which nevertheless offers adequate support even for large, effective filter surfaces, is achieved if the support structure comprises a plurality of connection ducts forming the passages and running transversely to the channels and each time intersecting the cross-sectional contour of several channels in order to form passage holes. Such a support structure is can be manufactured at low cost and in particular as a solid, integral block. Moreover the connecting ducts can be connected in such a support structure to an evacuation-duct manifold issuing substantially centrally to them. Not only does this design reduce the dead volume of plastic melt within the housing, but also this objective can be attained at low manufacturing cost while assuring the mechanical strength of the support structure. Conceivably the connection ducts might issue laterally of the support structure into a slotted, radially flaring part of the evacuation duct. However in such a case when considering the desirability of minimal dead volume of plastic melt, the first duct sections of the connection ducts, which preferably run parallel within the support structure to the cylinder generatrix of the curved support surface, appropriately are each connected by particular, associated, radially running second duct sections to the manifold duct.

During purification, the filter belt is loaded with the solid contaminants in the region of the channels. Even though with respect to minimal motional drag the channels ought to be free of transverse jumps, a preferred embodiment nevertheless requires that the channels within a first partial zone of the support surface shall terminate within this surface and in that as seen in the direction of advance, in a second partial zone of the support surface, channels therein shall start within the support surface, the channels of the second partial zone being staggered behind and relative to the channels of the first partial zone. Such a channel configuration allows using the entire filter-belt surface for purification and as a result the filter-belt service life is substantially lengthened.

Between the beginnings of the channels of the second partial zone of the support surface, that is between the ribs remaining between these channels, the support structures may be fitted with slanted surfaces to minimize the motional drag of the filter belt.

Seen in the direction of advance of the filter belt, the length of the first and second partial zone of the support surface is selected in such manner that the filter belt shall be loaded with contaminants as uniformly as possible. Appropriately the ends of the channels of the first partial zone of the support surface and the beginnings of the channels of the second partial zone are situated approximately at the middle of the support surface as seen in the direction of advance of the filter belt.

The feed channel may issue into the housing while being coaxial with the feed duct. As a result the integration of the purification apparatus into a more complex plastic processing plant or the like will be facilitated. On the other, in an especially simple design, the feed duct issues into the housing of the feed chamber by means of a duct section which runs approximately radially to the support surface. In this manner the dead volume of material to be purified within the housing can be further reduced while nevertheless assuring uniform loading of the filter belt. Preferably, as seen in circumferential direction of the support surface, the duct section issues approximately centrally into the feed chamber.

In an especial compact design of the purification apparatus, the filter belt will wrap—as already mentioned—the support by at least 180°, and is guided by means of at least approximately mutually parallel planar belt segments within the housing in an essentially flat belt feed chamber toward the support structure and further is moved away from the support structure in an essentially flat belt evacuation chamber. The belt feeder chamber and the belt evacuation chamber are configured to be mutually parallel to contribute to easier temperature control of the housing.

When purifying thermoplastics, the material is kept at the melting point in the region of the support structure, and depending upon the material, the housing is illustratively kept at a temperature from 180 to 330° C., through also high or lower, using temperature control. On the other hand, in the region of the belt feeder chamber and/or of the belt evacuation chamber, the housing is cooled in order to seal at least the evacuation site of the filter belt by solidifying material. In order to attain this objective with a compact housing, the belt feeder chamber and/or the belt evacuation chamber is partitioned by a heat insulation means transverse to the plane of segments of the filter belt guided therein into a temperature-controlled zone near the support structure and a cooling zone far from the support structure.

In a preferred embodiment, the belt feeder chamber and/or the belt evacuation chamber will widen at least in a partial zone in the direction of advance of the filter belt transversely to the plane of this band. The widened belt evacuation chamber is approximately situated in the cooling zone and allows evacuating the contaminant-loaded filter belt, whereas the this widening of the belt feeder chamber will narrow again near the support drum and then facilitate the temperature control of the material to be purified.

In particular the belt evacuation chamber, though also the belt feeder chamber, can be adequately sealed by a "plug" of solidified plastic melt in the manner discussed above. However it was found that temperature control is particularly problematic at the side of belt evacuation because there the filter belt is loaded with contaminants which strongly affect the solidification of the plastic melt. The time interval required to change the overall state of the plastic melt may rise considerably and thereby adversely affect the apparatus' purification performance. Drawbacks of this sort can be avoided, as called for in a preferred embodiment, by placing, at least on the side of the belt evacuation chamber, a sealing strip displaceably guided transversely to the plane of the filter belt and made to rest, in sealing manner, between a sealing position while tightly resting on the filter belt and a release position away from the filter belt. In order that the sealing strip displaceable relative to the housing may be guided in sealing manner despite the high pressure of the plastic melt, the sealing strip is made to rest flat by its side surface away from the flow path of the material to be purified transversely to the direction of advance of the filter belt and across the full width of the filter belt against a sealing surface of the housing. In such a design the pressure of the molten plastic simultaneously will produce the compression of the mutually associated and preferably even ground surfaces. In this design the sealing strip runs transversely to the filter belt and projects beyond its longitudinal edges and is also sealed in that zone by its side surfaces relative to the housing sealing surface. Accordingly when the sealing strip rests against the filter belt, it may enclose same completely and assure annular sealing. Appropriately the sealing strip is metallic and fitted on its side facing the filter belt with an elongated seal made of elastomers or another elastic material. Even though such a seal is especially suitable to seal the belt evacuation chamber of the above discussed purification apparatus, such sealing also can be advantageously used for other purification apparatus of the species.

The drive means moving the sealing strip between its two positions is appropriately a hydraulic actuator or the like. Such or another drive means is appropriately mounted outside the flow path of the plastic, that is, in an unpressurized region. Preferably the actuation forces are transmitted by at least one cylindrical dowel guided in displaceably manner in a dowel borehole toward the sealing strip. Appropriately the dowel is a loose pin to circumvent jamming. Preferably at least two dowels are mounted on each side of the sealing strip and a distance apart from each other, the dowel apertures running in the direction of motion of the sealing strip, the drive means actuating the dowels acting on oblique thrust surfaces.

The movement of the filter belt can be implemented by hydrostatic-pressure differences along the flow path of the plastic melt. Specifically regarding embodiments wherein the pressure of the plastic melt is lowered during conveyance to lower the motional drag on the filter belt, preferably a conveyor moving the filter belt is provided. The conveyor may be in the form of a pair of compressing rollers. However preferably it shall be hydraulically displaceable and hydraulically actuated clamping tongs which in their reciprocating motion grips and clamps the filter belt. However the clamping tongs also may be in the form of carriages hydraulically displaced along a linear guide of the filter belt.

Conventional purification apparatus of the kind being discussed herein guide a filter band from a supply coil. Depending on the degree of soiling of the material to be purified and the degree of purity of the purified material, conduction of filter band may be comparatively large. To minimize filter-band consumption, a preferred embodiment of the invention designs it as an endless belt which in its direction of advance will cross a cleaning station offset from the support structure. The cleaning of the filter belt takes place in continuous or stepwise manner depending on the advance of the filter belt and not only saves filter-band material, but also allows lowering the pressure of the material on the feed side of the material to be purified. In the state of the art, high material pressures even at near full clogging of the filter belt caused by the contaminants have been allowed to achieve economical filter-band operation. If, on the other hand, as proposed herein, the filter belt is cleaned while the material is being purified, the degree of clogging of the material can be reduced by appropriately selecting the speed of advance of the filter belt and thereby the pressure of the material, without incurring time losses for belt changes or higher consumption of filter belts.

The above discussed concept of an endless filter belt with associated cleaning station not only applicable to purifying of the above discussed kind, but also to conventional cleaning equipment of independent inventive significance.

As regards a preferred embodiment, the filter belt is guided in endless form around the curves support surface of the support structure and around at least one rotatably supported reversing wheel. The reversing wheel may be a drive reversing wheel powered by the conveyor means. The reversing drive may constitute the sole drive for the filter belt, optionally all reversing wheels being driven.

The concept of cleaning the filter belt immediately upon material purification in a cleaning station to allow re-using the filter belt, is applicable not only to endless filter belts but also to apparatus where the filter band comes from a supply coil. The contaminated filter belt/band coming from the material purification apparatus is restored by this cleaning to such flexibility that it can be wound and used again. In a preferred embodiment the support structure is mounted in the path of advance of the filter band between a supply coil feeding the filter band and a winding system for the filter band, a cleaning station offset from the support structure being mounted in the path of advance and crossing the filter band. Again as was the case above for the material purification apparatus fitted with an endless belt, the cleaning station is applicable not only in material purification apparatus of the above kind, but also to conventional cleaning stations of independent inventive significance.

In both the above-discussed variants, the cleaning station preferably is in multistages to implement a cleaning effect matched to cleaning state. In a preferred embodiment the cleaning station comprises sequentially, as seen in the direction of advance of the filter belt, a scraper device and then at least one cleaning device. In this respect it was found advantageous for purifying thermoplastics to fit the scraper system with heaters preheating the filter belt and the at least one subsequent cleaning station with heaters raising the temperature of the at least one subsequent cleaning station beyond the preheating level. The cleaning station following the scraper system may be a fluidized bed cleaning station wherein a flow of particles, for instance sand, is applied to the filter belt. The fluidized bed cleaning station appropriately is operated at a temperature substantially higher than the thermoplastic melting point, for instance being at least 400° C., whereas the scraper system operates in the range of the material's softening point, for instance roughly 200° C. These temperatures however are material-dependent.

To carry out the final cleaning of the filter belt, one of the cleaning devices may be in the former of a blower illustratively blowing hot air through the filter belt.

As a rule the housing must be disassembled to install the filter belt into it. In a preferred embodiment much facilitating inserting or changing the filter belt, the housing comes in section and optionally comprises a multi-part, removable wall segment covering the edge of the filter belt over its full length inside the housing. By removing this cover-like wall segment, the edge zone of the filter belt will be uncovered over its full length inside the housing and as a result the filter belt can be removed transversely to its direction of advance from the housing, or be inserted in it. In this design the feed duct and the evacuation duct appropriately issue into the residual housing, And consequently these duct hookups need not be loosened to change a filter belt.

BRIEF DESCRIPTION OF THE DRAWINGS

The illustrative embodiments of the invention are elucidated further below in relation to the drawing.

FIG. 4 is a sectional elevation similar to FIG. 1 of a variation of the apparatus, FIG. 5 is a sectional elevation of a sealing means applicable to the apparatus of FIG. 4 and seen along a line V—V in FIG. 6, FIG. 6 is a sectional elevation of the sealing means seen along a line VI—VI in FIG. 5, FIG. 9 is a further variant to purify a plastic melt from solid contaminants.

DESCRIPTION OF THE PREFERRED EMBODIMENTS

Figure 1:
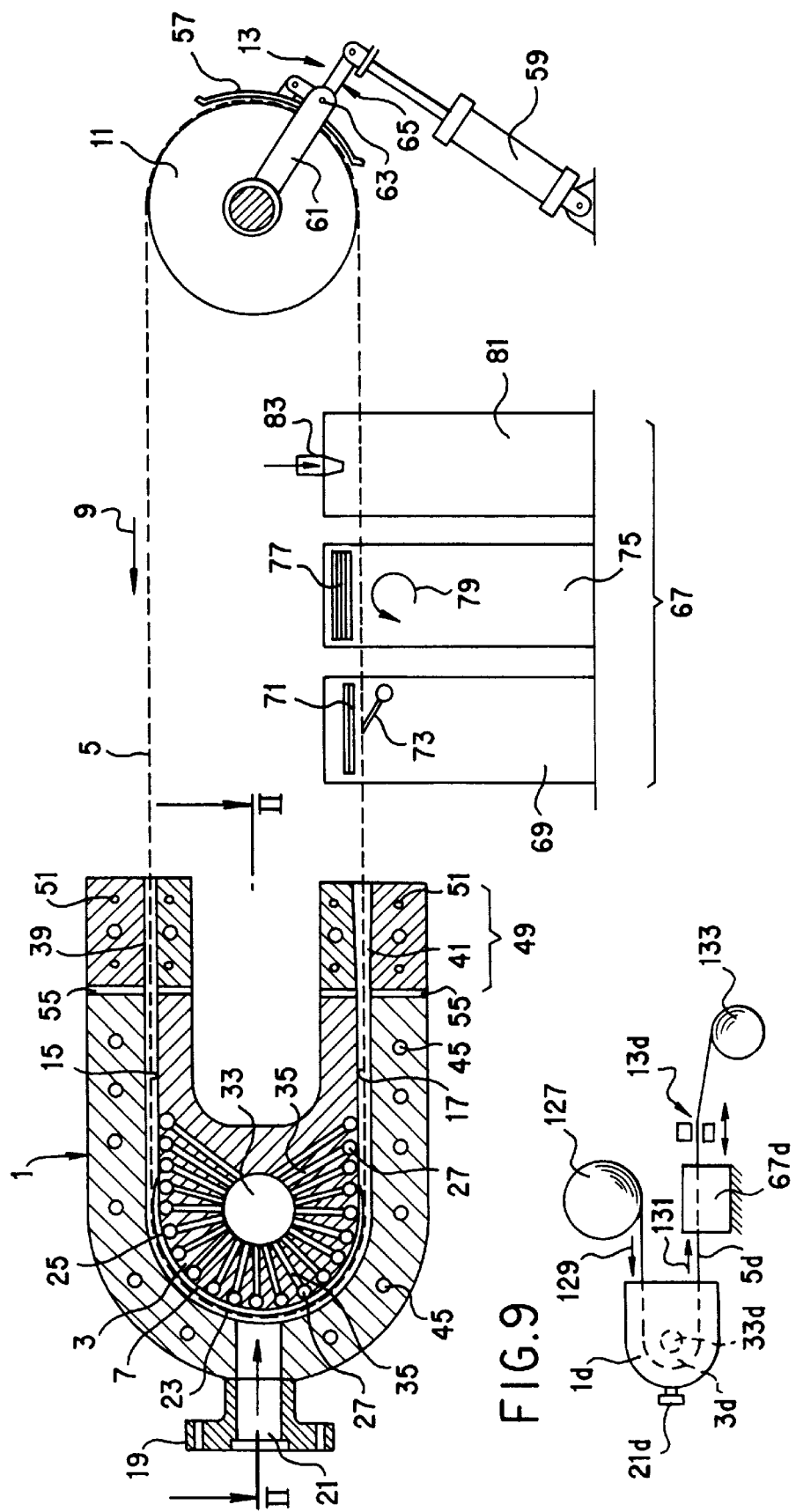
FIG. 1 is a sectional elevation of apparatus to purify a plastic melt from solid contaminants and is seen along a line I—I of FIG. 2.

The apparatus for purifying viscous materials, in particular to rid a plastic melt of solid contaminants, especially metal wastes and the like, comprises a housing 1 containing a support structure 3 in a chamber. An endless filter belt 5 consisting of a very narrow-mesh, optionally a multi-layer metal cloth, wraps around a curved, outer peripheral zone or support surface 7 of the support structure 3 by a wrap angle of about 180° along a conveyance path further elucidated below wherein the filter belt 5 is inserted into the housing 1 in the direction of an arrow 9 and after passing around the support structure will be moved out of the housing laden with solid contaminants. The filter belt 3 is moved around a reversing wheel 11 for conveyance, this wheel cooperating with a hydraulic conveyance system 13 elucidated below. The conveyance system 13 moves the filter belt 3 stepwise.

The support structure 3 is rigidly stationary in the chamber of the housing 1 and reverses the filter belt 5 by 180°. The filter belt 5 runs along planar support surfaces 15, 17 onto the curved support surface 7 and away from it. The planar support surfaces 15, 17 merge tangentially and flush into the curved support surface 7.

The material to be purified passes through a feed duct 21 fitted with a hookup flange 19 into a feed chamber 23 of the housing 1, this chamber following the support surface contour of the support structure 3 along the curved support surface 7 and the planar support surfaces 15, 17. The feed duct 21 situated in a central position of the housing 1 both in the circumferential direction of the feed chamber 23 and in its axial direction and passes through the housing wall radially into the center of the circular-cylindrical curved support surface 7. The support surfaces 7, 15 and 17 are fitted with a plurality of mutually parallel channels 25 running in the conveying direction of the filter belt 5 both in the curved support surface 7 and in its directly adjoining portions of the planar support surfaces 15, 17. Accordingly the channels 25 run in planes perpendicular to the cylinder generatrix of the curved support surface 7. Transversely to the channels 25, the support structure 3 comprises a plurality of illustratively cylindrical ducts 27 distributed along the channels and running parallel to each other, touching the channels 25 to form passage apertures 29, as most clearly shown in FIG. 3. The ducts 27 flare continuously or, as in this instance, step-wise in the direction of flow toward an evacuation duct 33 consisting of a hook-up flange 31 of the housing 1. The evacuation duct 33 is connected by radial connecting ducts 35 formed in one end face of the support structure 3 to the individual ducts 27. Even though evacuation duct 33 might be connected to the ducts 27 also by a common radical gap, the communication through individual radial connecting ducts 35 however reduces the dead volume of plastic melt in the housing 1, and consequently the apparatus may be more easily heat controlled. The support structure 3 is fitted with an internal chamber 37 to lower the heat capacity of the apparatus.

Figure 2:
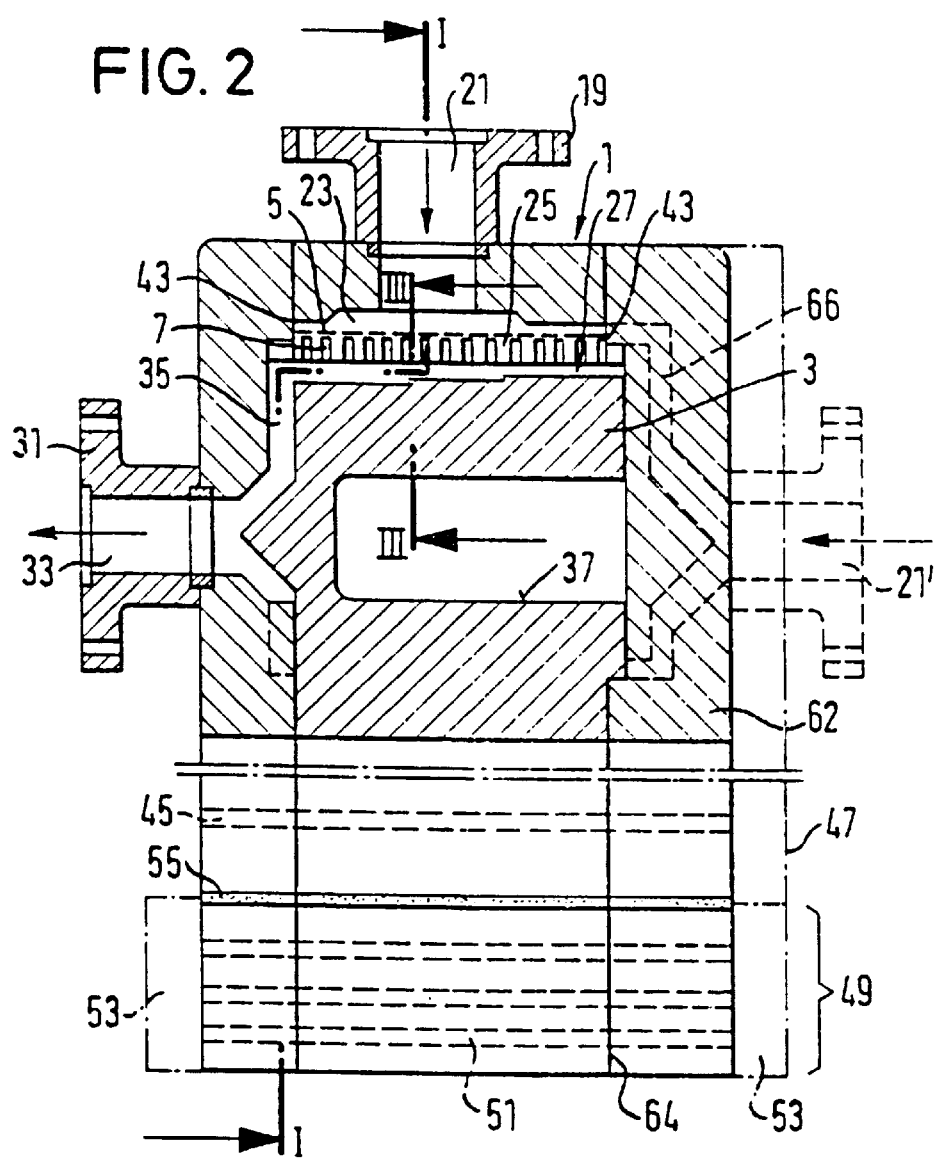
FIG. 2 is a sectional view of the apparatus along a line II—II of FIG. 1.

On its conveyance path within the housing 1, the filter belt 5 crosses a substantially planar belt feed chamber 39 adjoined in rectilinear extension by the planar support portion of the support structure 3. On the evacuation side, the planar support surface 17 of the support drum 3 adjoins in substantially rectilinear extension a belt evacuation chamber 41. At least within the zone of the support structure 3, preferably however over all its path inside the housing 1, the filter belt 5 is guided at its edges by edge flanges 43 (FIG. 2).

The plastic must be kept at the softening or melting point during purification. For that purpose the housing 1 contains heating ducts 45 holding a temperature regulating fluid both in the vicinity of the support structure 3 and in the adjoining zones of the belt feed chamber 39 and belt evacuation chamber 41, said fluid for instance being air or a liquid like water. The temperature regulating fluid is supplied, and where called for, removed through manifolds or the like indicated at 47 (FIG. 2). A temperature regulator not shown in further detail keeps the housing 1 and hence the plastic melt at a suitable temperature for instance of 180 to 330° C., preferably 200 to 220° C.

The prevent the plastic melt from leaking through the belt feed chamber 39 and the belt evacuation chamber 41, a cooling zone 49 in the housing 1 adjoins at the intake side the belt feed chamber 39 and at the outlet side the parallel belt evacuation chamber 41, the housing 1 containing ducts 51, separate from the ducts 45, for a coolant fluid, preferably a coolant liquid because of latter's higher heat capacity. At 53, FIG. 2 indicates feed and evacuation systems for the cooling fluid. The cooling zone 49 is fitted with a separate temperature regulator assuring solidification of the plastic forced out of the chambers 39, 41 and in this manner sealing these chambers from the outside. To be able to keep the cooling zone 49 at a lower temperature, this part of the housing 1 adjoins through a thermally insulating layer 55 the portion of the housing 1 containing the support structure 3. The belt feed chamber 39 flares slightly from the cooling zone to the region of the support surfaces in order to facilitate the temperature control of any plastic having penetrated the belt feed chamber 39. The belt evacuation chamber 41 widens correspondingly toward the outside in the region of the cooling zone 49 in order to facilitate stripping the filter belt 5 loaded with contaminants.

The filter belt 5 is intermittently advanced from the moving system 13 in the direction of the arrow 9 as soon as the pressure detected by an omitted pressure sensor in the feed duct rises upon excessive loading with contaminants of the filter belt 5. The conveying system 13 comprises a clamping jaw 57 forced by a hydraulic actuator 59 radially against the filter belt 5 guided along the periphery of the reversing wheel 11. For that purpose a support level 61 is supported coaxially with the reversing wheel 11 and is linked at its free end 63 to an elbow lever 65 which articulates at one arm on the clamping jaw 57 and its other arm on the piston rod of the hydraulic actuator 59. One arm of the elbow lever 65 runs substantially in the circumferential direction of the reversing wheel, namely in the direction of advance, whereas the other arm runs in the extension of the support lever 61. In this manner the hydraulic actuator 59 generates not only a force component at the clamping jaw 57 advancing the filter belt 5, but also a force component pressing the clamping jaw 57 against the filter belt 5.

Event though the above discussed purification apparatus is highly compact, large, effective filter surfaces about 0.1 $m^2$ or more can be implemented in problem free manner. Because the passage apertures 29 formed between the channels 25 and the ducts 27 lie at the bottom of the channels 25, the motional drag against the filter belt 5 is comparatively low even though its effective filtering surface is large. In particular, when the feed duct 21 is unpressurized during the filter-belt motional phase, this filter belt 5 can be moved by simple means.

Figure 3:
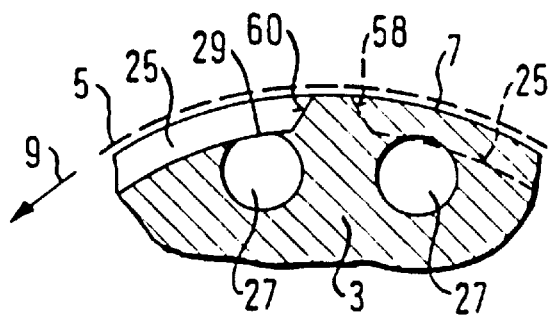
FIG. 3 is a section through the apparatus seen along a line III—III of FIG. 2.

In the purification mode, the filter belt first is laden with contaminants in the zone of the channels 25. The strip-like support surfaces remaining between the channels 25 are utilized only inadequately this way. For palliation, the channels beginning in the feed-side, planar support surface 15 will end within the curved support surface 7 as indicated in FIG. 3 at 58 by a chamfer rising in the direction of advance 9, whereas, on the other hand, the channels 25 running to the evacuation-side, planar support surface 17 start within the curved support surface 7, as indicated at 60. The evacuation-side channels 25 run transversely to their longitudinal direction and are staggered behind and relative to the intake-side channels, making possible thereby to have full loading of the filter belt 5 with contaminants and hence improved use of the filter belt 5.

To allow changing the filter belt in problem-free manner, the housing comprises a sidewall part 62 (FIG. 2) free of material feed apertures and is kept by omitted screws or the like detachably affixed like a cover to the remaining residual housing. The boundary surface indicated at 64 is located at a site where the edge of the filter belt 5—with detached wall part 62—is accessible over the full length of the filter belt zone within the housing 1. Following removal of the wall part 62, the filter belt 5 can be removed from or inserted into the housing 1 transversely to its direction of advance or longitudinal direction respectively.

Alternatively however the wall 62 also may form the feed duct as indicated at 21'. In that case connection ducts 66 are associated with the feed duct 21' to connect it to the feed chamber 23. Appropriately the feed cut 21' and the discharge duct 33 are mounted coaxially, thereby facilitating in some applications the integration of the purifying apparatus into a more complex plant.

In order to use if possible the endless filter belt long-term, that is for more than one pass, the contaminant-laden filter belt 5 crosses in this case a multi-stage cleaning station 67 before arriving at the reversing roller 11, being rid in said station of the deposits and then being returned to the purification apparatus. In this cleaning station 67, the filter belt 5 first passes through a scraper system 69 wherein the filter belt 5 is preheated by a heater 71 and is coarsely rid by at least one scraper 73 resting against the filter belt 5. In the direction of motion of the filter bed 5, the scraper system 69 is followed by a fluidized-bed cleaning station 75 wherein the filter belt 5 is heated by a heater 77 to a temperature above the preheating temperature of the heater 71 and is cleaned further by a stream of particles 79, in particular a sand stream. The preheating temperature depends on the material to be cleaned and for instance is between about 160 and 350° C., on the average between about 200 and 220°, but the filter belt 5 will be heated by the heater 77 to a temperature of about 400° C. or above. The fluidized-bed cleaning station 75 is followed by a blow-out station 81 for final cleaning, wherein a flow of hot air is blown by nozzles 83 through the filter belt 5. Instead of or in addition to one of the systems 69, 75 and 81, one may also use other cleaning means cleaning the filter belt 5 for instance by pyrolysis or by baking this belt. Moreover some of the systems 69, 75 or 81 may be omitted or present several times.

Variants of the purification apparatus discussed above in relation to FIGS. 1 through 3 are described below. Wherein these variants components already discussed are used, they will be denoted by the same reference numerals, though a letter will be added to distinguish them. The above description should be consulted for a discussion of the design and operation.

FIG. 4 shows a variant of the purification apparatus which foremost differs by the design of the output-side sealing of the housing 1*a*, by the design of the conveyor 13*a* again moving the endless filter belt 5*a* stepwise and by the design of the scraper system 69*a* of the cleaning station 67*a*. Elsewhere the design fully corresponds to that of the purification apparatus of FIGS. 1 through 3, in particular also regarding the design of the support structure 3*a* and its support surfaces 7*a*, 15*a* and 17*a* fitted with channels 25*a*. While the components 31, 37, 43, 47 and 53 are not shown in FIG. 4, they are nevertheless present.

Whereas in the embodiment of FIG. 4, the feed-chamber 39*a* seals the intake side by cooling, the exit side of the purification apparatus is sealed by a sealing strip 85 running across the full width of the filter belt 5*a* and displaceable by an adjustment drive, in this instance a hydraulic actuator 87, between a release position raised away from the filter belt 5*a* and a sealing position resting on this belt. As elucidated below, the sealing strip 85 rests by its planar and ground side 89 facing away from the feed chamber 23*a* against a sealing surface 91, also ground, of the housing 1*a*. The compression required for sealing will then be generated in this embodiment by the pressure of the plastic melt in the purification apparatus. During operation of the purification apparatus, the hydraulic actuator 87 forces the sealing strip 85 against the filter belt 5a. During the advance of the filter belt 5a, the feed pressure of the plastic melt in the feed chamber 23a is lowered substantially, and the sealing strip 85 is moved away from the filter belt 5a.

The conveyor 13a is combined into one construction unit with the housing 1a of the purification apparatus and comprises a linear guide 93 along which a clamping carriage 97 is made to move to-and-fro along the filter belt 5a by a hydraulic actuator 95. The clamping carriage 97 comprises a clamping jaw 99 displaceable transversely to the plane of the filter belt and adjusted by a further linear hydraulic actuator 101 between a clamping position, wherein it forces the filter belt 5a against a mating jaw 103 at the side of the carriage, and a position releasing the filter belt 5a. When the clamping jaw 99 is actuated, the conveyor 13a can pull the filter belt 5a out of the purification apparatus. When the clamping jaw 99 is released, the conveyor 13a can carry out a return stroke unloaded.

The scraper system 69a of the cleaning station 67a is combined with the housing 1a of the purification apparatus into one construction unit. The scraper 73a in the vicinity of the outlet gap rests directly against the filter belt 5a, on one hand offering mechanistic advantages and on the other hand avoiding intermediate cooling of the residual plastics adhering to the filter belt 5a. An additional preheating heater as indicated at 71 in FIG. 1 can be optionally eliminated.

FIGS. 5 and 6 show details of a sealing system as may be used in a purification apparatus of FIG. 4 on the discharge side of the filter belt 5a. FIGS. 5 and 6 show the filter belt 5b in the region of the belt evacuation chamber 41b formed by the housing 1b. The elongated sealing strip 85b is displaceable perpendicularly to the plane of the filter belt 5b within a chamber 105 enclosing the filter belt 5b of a guide part 107 enclosing the filter belt 5b, between a sealing position wherein the metallic sealing strip 85b rests by an elastomeric, elongated seal 109 in sealing manner on the filter belt 5b and a raised position releasing the filter belt 5b for conveyance. The sealing strip 85b runs beyond the edges of the filter belt 5b and together with these projecting end zones 111 rests by its side surface 113 located at the front as seen in the direction of conveyance against a sealing surface 115 of the housing 1b. The side surface 113 and the sealing surface 115 are ground flat and are compressed against each other in sealing manner by the pressure of the plastic melt.

Several dowels 116 are present in the guide 107 on both sides of the plane of the filter belt 5b to drive the sealing strip 85b and are mounted loosely displaceable in dowel boreholes 117 running in the direction of displacement of the sealing strip. The dowels 116 and their associated boreholes 117 are cross-sectionally circular and accordingly may be manufactured with high accuracy. The dowels 116 are mutually opposite at least in the vicinity of the ends 111 of the sealing strip 85b. Rod-like sliders 119 are displaceably guided in the guide 107 to drive the dowels 116 in the longitudinal direction of the sealing slip 85b. The sliders 119 rest by identical sloping surfaces 121 against the dowels 116, and, for joint displacement of the sliders 119 by the hydraulic actuator 87b, one slider 121 drives the sealing strip 85b by means of the dowels 116 while the other slider 119 releases the dowels 116. It is understood in this respect that other design may also be used to drive the sealing strip. In particular the sealing strip might be ganged to the plunger of the hydraulic actuator, or separate hydraulic actuators might be combined with the sliders 119.

Figure 7:
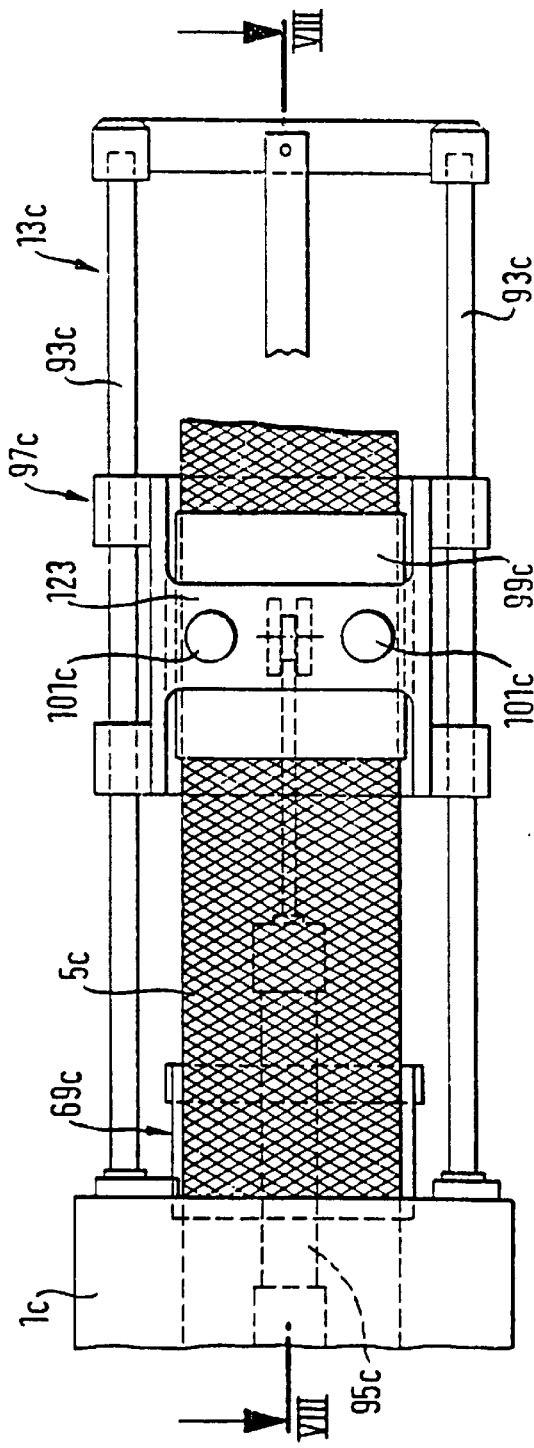
FIG. 7 is a topview of a conveyor applicable to the apparatus of FIG. 4.
Figure 8:
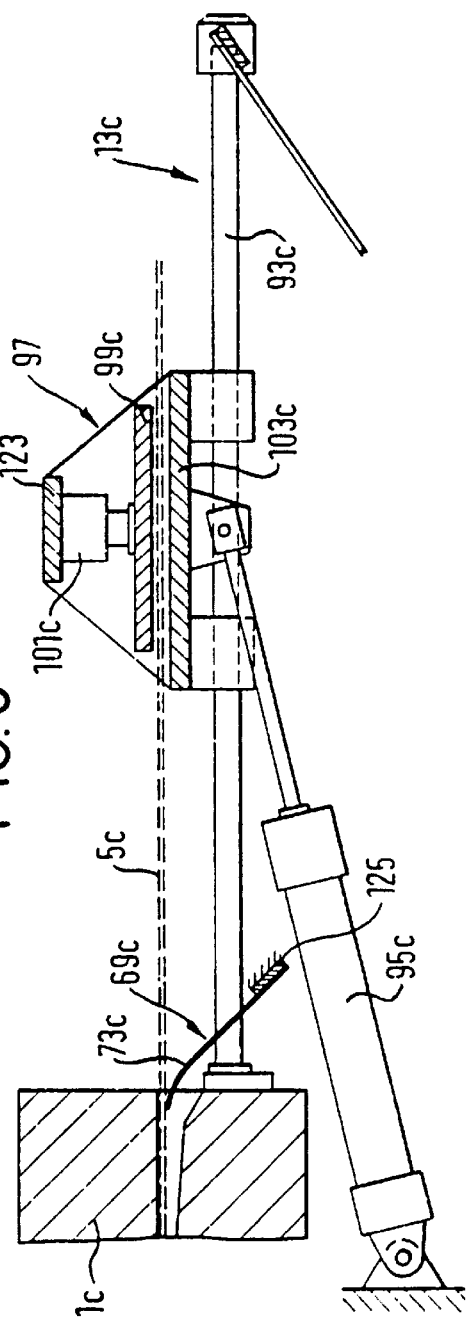
FIG. 8 is a sectional elevation of the conveyor seen along a line VIII—VIII in FIG. 7.

FIGS. 7 and 8 show details of a preferred embodiment of a conveyor 13c applicable to the embodiment of FIG. 4, inclusive a preferred design of a scraper system 69c, for the filter belt 5c, which also is combined with the housing 1c of the purification apparatus into one construction unit. The clamping carriage 97c of the conveyor 13c is displaceably guided along two mutually parallel linear guides 93c by mating jaws 103c parallel to the plane of the filter belt 5c. Two hydraulic actuates 101c are kept mutually apart at a bridge 123 spanning the filter belt 5c and these actuators in turn displaceable guide the clamping jaws 99c perpendicularly to the plane of the filter belt 5b. When the hydraulic actuators 101c are extended, the clamping jaw 99c clamps the filter belt 5c against the mating plate 103c and as a result the hydraulic actuator 95c can pull the filter belt 5c out of the purification apparatus when the clamping carriage 97 is being moved.

The scraper 73c is mounted underneath the filter belt 5c and rests resiliently against the filter belt 5c over the latter's full width. Whereas the support 125 of the scraper 73c is outside the housing 1c, the scraper blade resting against the filter belt 5c enters the belt evacuation gap of the housing 1c. In this manner the housing 1c constitutes a bearing to absorb the compression by the scraper 73c.

In the above variants of the purification apparatus, the filter structure is in the form of an endless filter belt. Using an endless filter belt offers the advantage that it can be constantly be cleaned on the spot without having to shut down the operation of the purification apparatus to change the filter belt. Accordingly the filter belt can be fed into the cleaning station 77 or 67a already at low soiling and consequently the feed pressure of the material to be purified can be lowered in the feed duct. As the feed pressure is lowered, the belt is less stressed mechanically and its service life is commensurately lengthened.

FIG. 9 shows an embodiment variation of the above discussed purification and cleaning equipment and different from those foremost in that the filter band 5d is fed from a supply coil 127 in the direction of an arrow 129 to the housing 1d of the purification apparatus. The filter band 5d is reversed by 180° at the support structure denoted by 3d in the housing 1d beyond the support structure 3d, and moves in the direction of the arrow 131 through a cleaning station 67d before being rewound on a core or the like of a winding system 133. The filter band 5d rewound in the rewinding system 133 can be used again once it has been transformed into the supply coil. As indicated at 13d, a conveyor may be used to move the filter band 5d. This conveyor 13d may be a pair of advancing rollers or a clamping-tongs system as already discussed above in relation to FIGS. 1 or 4. This conveyor 13d may be mounted either before or after the cleaning station 67d. The material purification apparatus per se appropriately corresponds to the design discussed in relation to FIGS. 1 and 4; however it also may be a conventional one, for instance using a purification chamber rectilinearly passing through the filter band. The cleaning station 67d may be designed in the manner shown in FIG. 1 or FIG. 4.

What is claimed is:

1. Apparatus for ridding a viscous material of solid contaminants, comprising:
   a housing fitted with a feed duct for the material to be purified and an evacuation duct for the purified material,
   a filter belt/band, displaceable in its longitudinal direction and capable of separating the solid contaminants from the viscous material passing therethrough, inserted in a sealing manner in the flow path of the material inside the housing between the feed duct and the evacuation duct, a conveyor advancing the filter belt/band continuously or stepwise, a support structure stationary in the flow path and mounted on the side of the filter belt/band facing the evacuation duct, the support structure comprising:

a support surface supporting the filter belt/band comprising a curved support portion in the form of a cylinder, which deflects the filter belt/band by an angle more than 90°, and parallel first and second planar portions separated by the curved support portion wherein the support surface is substantially planar at the first and second planar portions, the first and second planar portions respectively adjoining the curved support portion in a tangential and flush manner thereto, a plurality of channels which are mutually parallel and adjacent each other running in a conveying direction of the filter belt/band and open to the support surface at least in the region of the curved support portion, and a plurality of connecting ducts beginning at, and in fluid communication with the channels moving the purified material to the evacuation duct, wherein the feed duct comprises a feed chamber covering at least the region of the support surface fitted with channels.

2. Apparatus as claimed in claim 1, wherein the first and second planar portions of the support surface are also fitted, at least in a portion adjoining the curved support portion, with a plurality of mutually parallel channels running in the conveying direction on the filter belt/band and open toward the support surface and at which connecting ducts move the purified material to the evacuation duct.

3. Apparatus as claimed in claim 2, wherein the connecting ducts run inside the support structure and comprise first duct segments running parallel to the cylindrical generatrix of the curved support portion and radially running second duct segments that communicate with the manifold duct.

4. Apparatus as claimed in claim 3, wherein the first duct segments run transversely to the channels and intersect each of the cross-sectional contours of several channels forming passage apertures.

5. Apparatus as claimed in claim 4, wherein the connecting ducts communicate with the manifold duct of the evacuation duct, the manifold duct substantially leading centrally to the connecting ducts.

6. Apparatus as claimed in claim 1, wherein the channels in a first partial zone of the support surface end within the support surface and the channels in a second partial zone of the support surface as seen in the conveying direction begin within the support surface, and the channels of the second partial zone are staggered halfway relative to the channels of the first partial zone.

7. Apparatus as claimed in claim 6, wherein support chambers are present in the support structure between the beginning of each channel of the second partial zone of the support surface.

8. Apparatus as claimed in either claim 6, wherein the ends of the channels of the first partial zone of the support surface and the beginnings of the channels of the second partial zone as seen in the conveying direction of the filter belt/band are situated approximately centrally to the support surface.

9. Apparatus as claimed in claim 1, wherein the feed duct of the housing runs approximately radially to the curved support surface and approximately centrally issues into the feed chamber.

10. Apparatus as claimed in claim 1, wherein the filter belt/band encloses the curved support portion of the support structure by and about 180° and is guided together with at least approximately parallel planar belt/band sections within the housing through a substantially flat belt feed chamber toward the curved support portion and also is moved away from the support structure through an essentially flat belt evacuation chamber.

11. Apparatus as claimed in claim 10, wherein the belt evacuation chamber runs approximately tangentially to the curved support portion of the support structure.

12. Apparatus as claimed in claim 10, wherein the belt feed chamber and the belt evacuation chamber are partitioned by a thermal insulation means transverse to the plane of the belt/band sections guided therein into a heat-controlled zone near the support structure and a cooling zone far from the support structure.

13. Apparatus is claimed in claim 10, wherein the belt feed chamber and the belt evacuation chamber widen at least in one partial zone, in the conveying direction of the filter belt/band transversely to the plane of the filter belt/band.

14. Apparatus as claimed in claim 1, the conveyor comprising a hydraulically actuated clamping jaw for the filter belt/band, the jaw being hydraulically displaceable in the conveying direction of the filter belt/band.

15. Apparatus as claimed in claim 14, wherein the filter belt/band is an endless belt, the clamping jaw clamps the filter belt between a reversing wheel reversing the filter belt, and the clamping jaw presses against the periphery of the reversing wheel.

16. Apparatus as claimed in claim 1, wherein the housing is partitioned optionally comprising a multi-section, detachable wall segment overlapping the guide path of the filter belt/band at least along one of the edges of the filter belt/band over the full length within the housing.

17. Apparatus as claimed in claim 1, wherein the viscous material is a plastic melt.

18. Apparatus for ridding a viscous material of solid contaminants, comprising:

a housing fitted with a feed duct for the material to be purified and an evacuation duct for the purified material, a filter belt/band displaceable in its longitudinal direction and separating the solid contaminants from the viscous material passing therethrough, inserted in a sealing manner in the flow path of the material inside the housing between the feed duct and the evacuation duct, a stationary support structure mounted in the flow path on the side of the filter belt/band facing the evacuation duct, the support structure comprising:

a support surface supporting the filter belt/band comprising a curved support portion in the form of a cylinder, which deflects the filter belt/band by an angle more than 90°, and parallel first and second planar portions separated by the curved support portion wherein the support surface is substantially planar at the first and second planar portions, the first and second planar portions respectively adjoining the curved support portion in a tangential and flush manner thereto, a plurality of channels which are mutually parallel and adjacent each other running in a conveying direction of the filter belt/band and open to the support surface at least in the region of the curved support portion, a plurality of connecting ducts beginning at, and in fluid communication with the channels moving the purified material to the evacuation duct, wherein the feed duct comprises a feed chamber covering at least the region of the support surface fitted with channels, and a conveyor advancing the filter band in a continuous and stepwise manner, wherein the support structure is mounted in the path of the filter band between a supply coil delivering the filter band and a winding system receiving the filter band, a cleaning station crossing by the filter band is mounted in an offset manner in a conveying direction relative to the support structure between the support structure and the winding system.

19. Apparatus for ridding a viscous material of solid contaminants, comprising:

a housing with a feed duct for the material to be purified and an evacuation duct for the purified material, a filter belt/band displaceable in its longitudinal direction and separating the solid contaminants from the viscous material passing therethrough, inserted in a sealing manner in the flow path of the material inside the housing between the feed duct and the evacuation duct, a stationary support structure mounted in the flow path on the side of the filter belt/band facing the evacuation duct, the support structure comprising:

a support surface supporting the filter belt/band comprising a curved support portion in the form of a cylinder, which deflects the filter belt/band by an angle of more than 90°, and parallel first and second planar portions separated by the curved support portion wherein the support surface is substantially planar at the first and second planar portions, the first and second planar portions respectively adjoining the curved support portion in a tangential and flush manner thereto, a plurality of channels which are mutually parallel and adjacent each other running in a conveying direction of the filter belt/band and open to the support surface at least in the region of the curved support portion, and a plurality of connecting ducts beginning at, and in fluid communication with the channels moving the purified material to the evacuation duct, wherein the feed duct comprises a feed chamber covering at least the region of the support surface fitted with channels, and a conveyor advancing the filter belt/band continuously or stepwise, wherein the filter belt/band moves toward the support structure in an essentially flat belt feed chamber and moves away from the support structure in an essentially flat belt evacuation chamber, one of these chambers but a least the belt evacuation chamber rests against a sealing strip which is guided in a displaceable manner transversely to the plane of the filter belt/band, adjustable by a drive system, between a distant release position on the filter belt/band, the sealing strip, by its side surface opposite the flow path of the material being purified rests two-dimensionally and transversely to the direction of motion of the filter belt/band across the full width of the filter belt/band and against a sealing surface of the housing.

20. Apparatus for ridding a viscous material of solid contaminants, comprising:

a housing fitted with a feed duct for the material to be purified and an evacuation duct for the purified material, a filter belt/band displaceable in its longitudinal direction and separating the solid contaminants from the viscous material passing therethrough, inserted in a sealing manner in the flow path of the material inside the housing between the feed duct and the evacuation duct, a support structure stationary in the flow path and mounted on the side of the filter belt/band facing the evacuation duct, the support structure comprising:

a support surface supporting the filter belt/band comprising a curved support portion in the form of a cylinder, which deflects the filter belt/band by an angle of more than 90°, and parallel first and second planar portions separated by the curved support portion wherein the support surface is substantially planar at the first and second planar portions, the first and second planar portions respectively adjoining the curved support portion in a tangential and flush manner thereto, a plurality of channels which are mutually parallel and adjacent each other running in a conveying direction of the filter belt/band and open to the support surface at least in the region of the curved support portion, and a plurality of connecting ducts beginning at, and in fluid communication with the channels moving the purified material to the evacuation duct, wherein the feed duct comprises a feed chamber covering at least the region of the support surface fitted with channels, and a conveyor advancing the filter belt/band in a continuous or stepwise manner, wherein the filter belt/band is an endless belt which crosses a cleaning station offset from the support structure conveying direction.

* * * * *